United States Patent
Yuan et al.

(10) Patent No.: US 9,473,196 B2
(45) Date of Patent: Oct. 18, 2016

(54) RADIO-FREQUENCY FRONT-END CIRCUIT OF MULTIBAND TERMINAL AND MULTIBAND TERMINAL

(71) Applicant: ZTE CORPORATION, Shenzhen, Guangdong Province (CN)

(72) Inventors: Ligang Yuan, Shenzhen (CN); Zhenglin Zhou, Shenzhen (CN)

(73) Assignee: ZTE Corporation (CN)

( * ) Notice: Subject to any disclaimer, the term of this patent is extended or adjusted under 35 U.S.C. 154(b) by 0 days.

(21) Appl. No.: 14/413,101

(22) PCT Filed: Jul. 10, 2013

(86) PCT No.: PCT/CN2013/079157
§ 371 (c)(1),
(2) Date: Jan. 6, 2015

(87) PCT Pub. No.: WO2013/185666
PCT Pub. Date: Dec. 19, 2013

(65) Prior Publication Data
US 2015/0180531 A1  Jun. 25, 2015

(30) Foreign Application Priority Data
Jul. 11, 2012 (CN) .................. 2012 2 0334721 U

(51) Int. Cl.
*H04B 1/401* (2015.01)
*H04B 1/00* (2006.01)
*H04W 72/04* (2009.01)

(52) U.S. Cl.
CPC .............. *H04B 1/401* (2013.01); *H04B 1/006* (2013.01); *H04W 72/0453* (2013.01)

(58) Field of Classification Search
CPC ... H04W 40/02; H04W 84/12; H04W 88/06; H04W 88/10; H04W 72/0453; H04B 1/0475; H04B 1/10; H04B 1/1027; H04B 1/71; H04B 15/02; H04B 17/345; H04B 1/401; H04B 1/006; H04B 1/0092; H04B 1/26; H04B 1/405; H04B 1/406; H04B 1/005; H04B 1/0053
See application file for complete search history.

(56) References Cited

U.S. PATENT DOCUMENTS

| 2004/0092285 | A1* | 5/2004 | Kodim | H01P 1/15 455/552.1 |
|---|---|---|---|---|
| 2005/0170790 | A1* | 8/2005 | Chang | H04B 1/005 455/90.3 |
| 2009/0180403 | A1* | 7/2009 | Tudosoiu | H04B 1/006 370/278 |

(Continued)

FOREIGN PATENT DOCUMENTS

| CN | 1917685 A | 2/2007 |
|---|---|---|
| CN | 101800566 A | 8/2010 |

(Continued)

OTHER PUBLICATIONS

European Search Report dated May 29, 2015 of European patent application No. 13804972.1.

*Primary Examiner* — Andrew Wendell
*Assistant Examiner* — Maryam Soltanzadeh
(74) *Attorney, Agent, or Firm* — Plumsea Law Group, LLC

(57) ABSTRACT

Disclosed is a radio-frequency front-end circuit of a multi-frequency terminal, including: a radio-frequency transceiver chip, a radio-frequency amplifier chip and a radio-frequency switch, wherein all frequency bands share one transmission port in the radio-frequency transceiver chip; the radio-frequency amplifier chip includes a plurality of radio-frequency amplifiers corresponding to frequency bands in which the radio-frequency transceiver chip transmits signals, and the plurality of radio-frequency amplifiers are integrated together and share a common input port; the input port of the radio-frequency amplifier chip is connected to the transmission port of the radio-frequency transceiver chip; the radio-frequency switch is connected to an output of the radio-frequency amplifier chip, and used for switching signals in different frequency bands.

5 Claims, 1 Drawing Sheet

(56) References Cited

U.S. PATENT DOCUMENTS

| | | | | |
|---|---|---|---|---|
| 2012/0157013 A1* | 6/2012 | Wu | ................... | H04B 1/0057 455/84 |
| 2013/0051287 A1* | 2/2013 | Aramata | ................ | H04B 1/525 370/278 |
| 2013/0309984 A1* | 11/2013 | Uejima | ................. | H04B 1/006 455/114.1 |

FOREIGN PATENT DOCUMENTS

| | | |
|---|---|---|
| CN | 202103661 U | 1/2012 |
| CN | 202759442 U | 2/2013 |
| WO | 2005088849 A1 | 9/2005 |
| WO | 2008089755 A1 | 7/2008 |
| WO | 2011127733 A1 | 10/2011 |

* cited by examiner

US 9,473,196 B2

RADIO-FREQUENCY FRONT-END CIRCUIT OF MULTIBAND TERMINAL AND MULTIBAND TERMINAL

CROSS-REFERENCE TO RELATED APPLICATION(S)

This application is the U.S. National Phase application of PCT application number PCT/CN2013/079157 having a PCT filing date of Jul. 10, 2013, which claims priority of Chinese patent application 201220334721.2 filed on Jul. 11, 2012, the disclosures of which are hereby incorporated by reference.

TECHNICAL FIELD

The present document relates to the mobile communication technology, and more particularly, to a radio-frequency front-end circuit of a multi-frequency terminal and a multi-frequency terminal.

BACKGROUND OF THE INVENTION

Today, the mobile terminal has increasingly become a portable essential communication tool. In a multi-mode terminal such as an LTE/TD-SCDMA/WCDMA/GSM terminal, there are a lot of transmission paths and power amplifiers for transmission, as shown in FIG. 1, a radio-frequency transceiver chip in a multi-frequency terminal in the related art is generally provided with a plurality of transmission ports, each port corresponds to one frequency band, and each frequency band corresponds to one radio-frequency amplifier and one filter, which is bound to affect the miniaturization of a multi-mode multi-standby terminal.

SUMMARY

The embodiment of the present document proposes a radio-frequency front-end circuit of a multi-frequency terminal to simplify transmission paths of the multi-frequency terminal.

A radio-frequency front-end circuit of a multi-frequency terminal, comprising a radio-frequency transceiver chip, a radio-frequency amplifier chip and a radio-frequency switch:

in the radio-frequency transceiver chip, all frequency bands share one transmission port;

the radio-frequency amplifier chip comprises a plurality of radio-frequency amplifiers respectively corresponding to a plurality of frequency bands in which the radio-frequency transceiver chip transmits signals, the plurality of radio-frequency amplifiers are integrated together and share one input port; the input port of the radio-frequency amplifier chip is connected to a transmission port of the radio-frequency transceiver chip;

the radio-frequency switch is connected to an output of the radio-frequency amplifier chip, and is configured to switch signals in different frequency bands.

Preferably, the radio-frequency front-end circuit of the multi-frequency terminal further comprises a plurality of filters respectively corresponding to a plurality of frequency bands in which the radio-frequency transceiver chip transmits signals, and inputs of the plurality of filters is connected to an output of the radio-frequency switch.

Preferably, the radio-frequency switch and the radio-frequency amplifier chip are integrated together.

Preferably, the radio-frequency amplifier chip and the plurality of filters are integrated together.

Preferably, the radio-frequency switch, the radio-frequency amplifier chip and the plurality of filters are integrated together.

The embodiment of the present document further discloses a multi-frequency terminal, comprising the abovementioned radio-frequency front-end circuit of the multi-frequency terminal.

In the embodiment of the present document, the plurality of frequency bands in the radio-frequency transceiver chip share one transmission port, the radio-frequency amplifiers are integrated together, thereby avoiding the problem of multiple transmission ports and complex paths and saving the internal space of the product.

BRIEF DESCRIPTION OF THE DRAWINGS

The FIG. 1 is a schematic diagram of a radio-frequency front-end circuit of a multi-frequency terminal in the related art.

PREFERRED EMBODIMENTS OF THE INVENTION

Hereinafter in conjunction with the accompanying drawings, the preferred embodiments of the present document will be described. It should be noted that, in the case of no conflict, the embodiments and features in the embodiments of the present application may be arbitrarily combined with each other.

Figure 1:
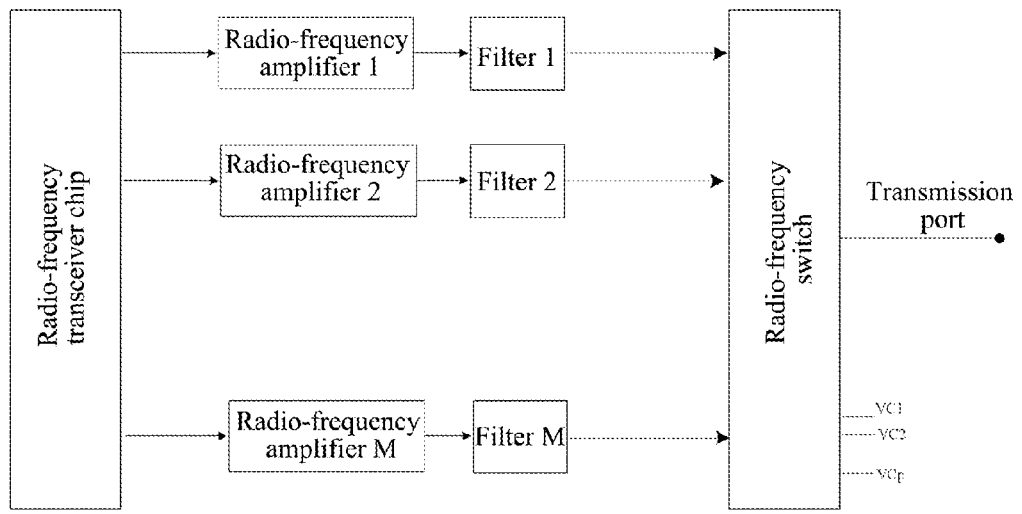
Figure 2:
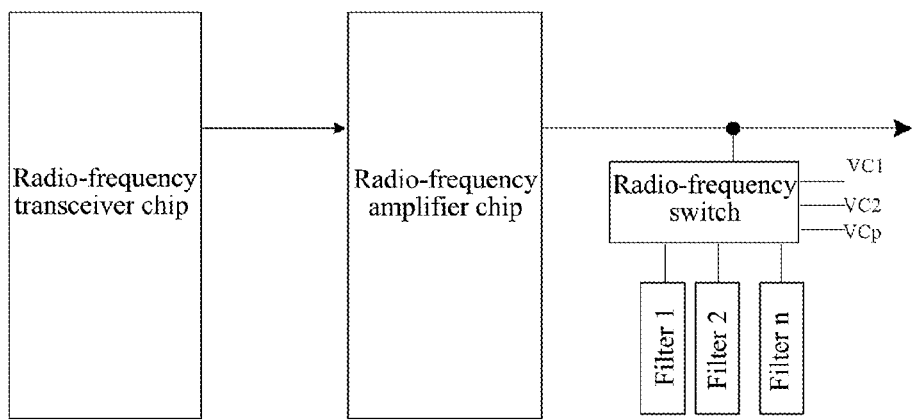
FIG. 2 is a schematic diagram of a radio-frequency front-end circuit of a multi-frequency terminal in accordance with an embodiment of the present document.

As shown in FIG. 2, the present embodiment discloses a radio-frequency front-end circuit of a multi-frequency terminal, comprising a radio-frequency transceiver chip, and a radio-frequency amplifier chip, and a radio-frequency switch:

in the radio-frequency transceiver chip, all frequency bands share one transmission port;

the radio-frequency amplifier chip comprises a plurality of radio-frequency amplifiers respectively corresponding to a plurality of frequency bands in which the radio-frequency transceiver chip transmits signals, the plurality of radio-frequency amplifiers are integrated together and share one input port; the input port of the radio-frequency amplifier chip is connected to the transmission port of the radio-frequency transceiver chip;

the radio-frequency switch is connected to the output of the radio-frequency amplifier chip, and used for switching signals in different frequency bands.

The radio-frequency front-end circuit of the multi-frequency terminal further comprises a plurality of filters respectively corresponding to the plurality of frequency bands in which the radio-frequency transceiver chip transmits signals, and inputs of the plurality of filters is connected to the output of the radio-frequency switch.

The working principle of the abovementioned circuit is as follows:

when the radio-frequency transceiver chip transmits radio-frequency signals in a plurality of frequency bands, one transmission port is shared, when the radio-frequency transceiver chip uses the frequency band 1 to transmit signals, the radio-frequency switch switches the radio-frequency circuit to the path 1 under the control of an internal controller, that is, the signals are amplified by the radio-frequency amplifier 1, and then transmitted via an antenna after the noise is filtered out with the filter 1; when the radio-frequency transceiver chip uses the frequency band 2 to transmit signals, the radio-frequency switch switches the radio frequency circuit to the path 2 under the control of an internal controller, that is, the signals are amplified by the radio-frequency amplifier 2, and then transmitted via an antenna after the noise is filtered out with the filter 2, and so on, when transmitting signals in other frequency bands, the working principle is the same as that in the abovementioned frequency bands 1 and 2.

The embodiment of the present document uses one signal transmission port, a plurality of RF amplifier are integrated together and one radio-frequency switch is used, which not only reduces the impact of switch insertion loss on the system performance, but also simplifies the internal design of the terminal and saves space within the terminal.

In the implementation process of an embodiment of the present document, it is also possible to integrate the radio-frequency switch, the radio-frequency transceiver chip and the filters into one chip, thereby further saving the internal space of the terminal, and reducing the volume of the terminal and the production costs.

The above description is only for preferred embodiments of the present document and not intended to limit the present document. For a person skilled in the art, the embodiments of the present document may have a variety of changes and modifications. Therefore, any changes, equivalents, improvements and updates made within the spirit and principle of the embodiment of the present document should be included within the protection scope of the present document.

INDUSTRIAL APPLICABILITY

The embodiment of the present document uses one signal transmission port, a plurality of RF amplifier are integrated together and one radio-frequency switch is used, which not only reduces the impact of switch insertion loss on the system performance, but also simplifies the internal design of the terminal and saves space within the terminal.

What is claimed is:

1. A radio-frequency front-end circuit of a multi-frequency terminal, comprising a radio-frequency transceiver chip, a radio-frequency amplifier chip, a radio-frequency switch, and a plurality of filters, wherein:
   in the radio-frequency transceiver chip, all frequency bands share one transmission port;
   the radio-frequency amplifier chip comprises a plurality of radio-frequency amplifiers respectively corresponding to a plurality of frequency bands in which the radio-frequency transceiver chip transmits signals, the plurality of radio-frequency amplifiers are integrated together and share one input port; the input port of the radio-frequency amplifier chip is directly connected to the transmission port of the radio-frequency transceiver chip;
   the radio-frequency switch is connected to an output of the radio-frequency amplifier chip, and is configured to switch signals in different frequency bands; and
   the plurality of filters respectively corresponds to the plurality of frequency bands in which the radio-frequency transceiver chip transmits signals, and the inputs of the plurality of filters are respectively connected to a plurality of outputs of the radio-frequency switch and thus parallelly connected to the output of the radio-frequency amplifier chip via the radio-frequency switch.

2. The radio-frequency front-end circuit of the multi-frequency terminal of claim 1, wherein: the radio-frequency switch and the radio-frequency amplifier chip are integrated together.

3. The radio-frequency front-end circuit of the multi-frequency terminal of claim 1, wherein: the radio-frequency amplifier chip and the plurality of filters are integrated together.

4. The radio-frequency front-end circuit of the multi-frequency terminal of claim 1, wherein: the radio-frequency switch, the radio-frequency amplifier chip and the plurality of filters are integrated together.

5. A multi-frequency terminal, comprising a radio-frequency front-end circuit, wherein the radio-frequency front-end circuit of a multi-frequency terminal comprising a radio-frequency transceiver chip, a radio-frequency amplifier chip, a radio-frequency switch, and a plurality of filters, wherein:
   in the radio-frequency transceiver chip, all frequency bands share one transmission port;
   the radio-frequency amplifier chip comprises a plurality of radio-frequency amplifiers respectively corresponding to a plurality of frequency bands in which the radio-frequency transceiver chip transmits signals, the plurality of radio-frequency amplifiers are integrated together and share one input port; the input port of the radio-frequency amplifier chip is directly connected to the transmission port of the radio-frequency transceiver chip;
   the plurality of filters respectively correspond to the plurality of frequency bands in which the radio-frequency transceiver chip transmits signals; and
   the inputs of the plurality of filters are respectively connected to a plurality of outputs of the radio-frequency switch and thus parallelly connected to the output of the radio-frequency amplifier chip via the radio-frequency switch.

* * * * *